United States Patent
Erickson et al.

(10) Patent No.: US 10,242,202 B1
(45) Date of Patent: Mar. 26, 2019

(54) APPARATUS AND METHOD FOR STAGED GRAPH PROCESSING TO PRODUCE A RISK INFERENCE MEASURE

(71) Applicant: Respond Software, Inc., Mountain View, CA (US)

(72) Inventors: Mark Erickson, Mountain View, CA (US); Christopher Calvert, Boulder, CO (US); Nick Gilligan, San Francisco, CA (US); Pramod G. Joisha, Saratoga, CA (US); Mitchell Webb, Parker, CO (US)

(73) Assignee: Respond Software, Inc., Mountain View, CA (US)

( * ) Notice: Subject to any disclaimer, the term of this patent is extended or adjusted under 35 U.S.C. 154(b) by 0 days.

(21) Appl. No.: 15/705,780

(22) Filed: Sep. 15, 2017

(51) Int. Cl.
| | |
|---|---|
| *G06F 21/57* | (2013.01) |
| *G06F 21/56* | (2013.01) |
| *H04L 29/06* | (2006.01) |
| *G06N 7/00* | (2006.01) |
| *G06K 9/62* | (2006.01) |

(Continued)

(52) U.S. Cl.
CPC ........... *G06F 21/577* (2013.01); *G06F 21/56* (2013.01); *G06K 9/6278* (2013.01); *G06N 5/04* (2013.01); *G06N 7/005* (2013.01); *H04L 63/1416* (2013.01); *H04W 12/12* (2013.01)

(58) Field of Classification Search
CPC ........ G06F 21/577; G06F 21/56; G06F 21/57; H04W 12/12; G06N 5/04; G06N 7/005; G06N 7/00; G06K 9/6278; G06K 9/62; H04L 63/1416; H04L 29/06

USPC .......................................................... 726/23
See application file for complete search history.

(56) References Cited

U.S. PATENT DOCUMENTS 9,275,340 B2 * 3/2016 Patil ..................... G06K 9/6253
9,930,059 B1 * 3/2018 Helmsen ............. H04L 63/1433
(Continued)

OTHER PUBLICATIONS

Norsys Software Corp. [online]. Norsys Software Corp., 1995-2018 [retrieved on Aug. 6, 2018]. Retrieved from the Internet: <URL: www.norsys.com>.

(Continued)

*Primary Examiner* — Abu S Sholeman
(74) *Attorney, Agent, or Firm* — Cooley LLP

(57) ABSTRACT

A computer implemented method includes processing a deterministic factual graph to produce superfacts. The deterministic factual graph has deterministic factual graph leaf nodes individually resolving facts to discrete-valued outcomes and parent nodes of the deterministic factual graph leaf nodes resolving the discrete-valued outcomes to superfacts. Each superfact is a qualitative characterization summarizing discrete-valued outcomes. A stochastic factual graph is processed to produce a risk inference measure. The stochastic factual graph has stochastic factual graph leaf nodes incorporating the facts or superfacts. The stochastic factual graph is a Bayesian network where each stochastic factual graph node, except for a base node, is associated with a probability function, and edges between stochastic factual graph nodes represent conditional dependencies. The risk inference measure is compared to an escalation threshold. An incident is evaluated when the risk inference measure exceeds the escalation threshold.

14 Claims, 4 Drawing Sheets

(51) Int. Cl.
*G06N 5/04* (2006.01)
*H04W 12/12* (2009.01)

(56) References Cited

U.S. PATENT DOCUMENTS

| | | | | |
|---|---|---|---|---|
| 2003/0225651 | A1* | 12/2003 | Chen | G06Q 10/08 |
| | | | | 705/36 R |
| 2010/0076784 | A1* | 3/2010 | Greenburg | G06Q 10/10 |
| | | | | 705/3 |
| 2014/0143536 | A1* | 5/2014 | Holland | H04W 12/12 |
| | | | | 713/153 |
| 2014/0157356 | A1* | 6/2014 | Lee | H04L 63/0263 |
| | | | | 726/1 |
| 2015/0244734 | A1* | 8/2015 | Olson | G06F 21/577 |
| | | | | 726/25 |
| 2016/0205122 | A1* | 7/2016 | Bassett | G06F 21/577 |
| | | | | 726/23 |
| 2017/0012942 | A1* | 1/2017 | Wittenschlaeger | |
| | | | | H04L 63/0421 |
| 2017/0083822 | A1* | 3/2017 | Adendorff | G06N 7/005 |
| 2017/0300911 | A1* | 10/2017 | Alnajem | G06Q 20/4014 |
| 2018/0048662 | A1* | 2/2018 | Jang | H04L 63/1425 |
| 2018/0196861 | A1* | 7/2018 | Lee | G06F 17/30958 |

OTHER PUBLICATIONS

Huginexpert [online]. Hugin Expert A/S, 1989-2018 [retrieved on Aug. 6, 2018]. Retrieved from the Internet: <URL: www.hugin.com>.

\* cited by examiner

APPARATUS AND METHOD FOR STAGED GRAPH PROCESSING TO PRODUCE A RISK INFERENCE MEASURE

FIELD OF THE INVENTION

This invention relates generally to evaluating information security telemetry to identify potentially malicious activity, such as fraud or a security breach. More particularly, this invention is directed toward staged graph processing to produce a risk inference measure.

BACKGROUND OF THE INVENTION

Computer security alerts produce high volume data that is difficult to evaluate. More particularly, the data volume overwhelms even advanced data evaluation techniques, such as a Bayesian network. A Bayesian network is a probabilistic graphical model that represents a set of random variables and their conditional dependencies via a directed acyclic graph (DAG). Each node of the DAG has an associated probability function. Edges between nodes represent conditional dependencies. A Bayesian network requires a large number of subject matter expert (SME) probability judgments to capture a full set of beliefs. The number of required probabilities depends on the number of edges in the network, but the joint probability distribution is a suitable heuristic. The size of the network's joint probability distribution can be calculated as the number of outcomes for each node to the power of the number of nodes in the belief network. For example, consider a hypothetical network used to determine whether a security event is malicious. If the network has 1 node for maliciousness (true or false), and 20 nodes for input facts (also true or false) that we believe are useful to predict maliciousness, then there are $2^{(1+20)}=2,097,152$ rows in the joint probability distribution. This is a prohibitively large amount of data entry needed to build a Bayesian model using existing techniques.

Accordingly, there is a need for improved techniques for evaluating potential risks associated with high volume computer security data and more robust feature sets needed to accurately predict maliciousness of potential security events.

SUMMARY OF THE INVENTION

A computer implemented method includes processing a deterministic factual graph to produce superfacts. The deterministic factual graph has deterministic factual graph leaf nodes individually resolving facts to discrete-valued outcomes and parent nodes of the deterministic factual graph leaf nodes resolving the discrete-valued outcomes to superfacts. Each superfact is a qualitative characterization summarizing discrete-valued outcomes. A stochastic factual graph is processed to produce a risk inference measure. The stochastic factual graph has stochastic factual graph leaf nodes incorporating the facts or superfacts. The stochastic factual graph is a Bayesian network where each stochastic factual graph node is associated with a probability function and edges between stochastic factual graph nodes represent conditional dependencies. The risk inference measure is compared to an escalation threshold. An incident is evaluated when the risk inference measure exceeds the escalation threshold.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
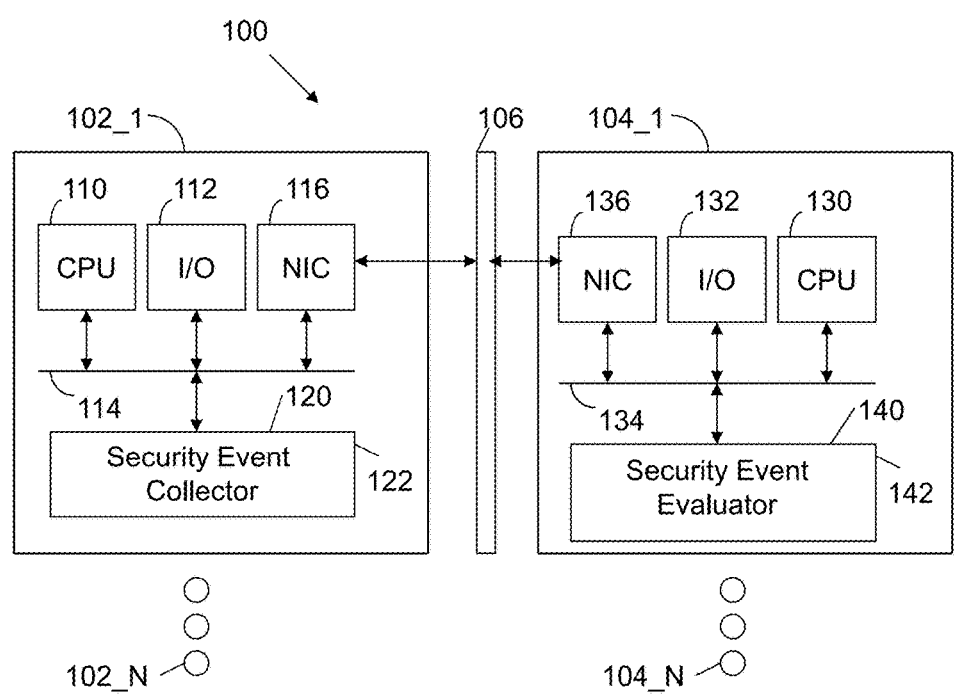
FIG. 1 illustrates a system configured in accordance with an embodiment of the invention.

FIG. 1 illustrates a system 100 configured in accordance with an embodiment of the invention. The system 100 includes a set of client machines 102_1 through 102_N—for example, belonging to a single enterprise that endeavors to evaluate potential risks associated with security events. The client machines 102_1 through 102_N are connected via a network 106 to at least one server 104_1, but typically a set of servers 104_1 through 104_N. The network 106 may be any combination of wired and wireless networks. By way of example, the server is operative as a cloud service supplying security event risk assessments to multiple enterprises that supply the server with security event information.

Each client device 102 includes standard components, such as a central processing unit 110 and input/output devices 112 connected via a bus 114. The input/output devices 112 may include a keyboard, mouse, touch display, and the like. A network interface card (NIC) 116 provides connectivity to network 106. A memory 120 is connected to the bus 114. The memory 120 stores instructions executed by the central processing unit 110. In one embodiment, the memory 120 stores a security event collector 122. The security event collector 122 collects security events associated with one or more client devices of an enterprise (e.g., client devices 102_1 though 102_N). In one embodiment, the collected data is sent to one or more servers 104_1 through 104_N for evaluation. In another embodiment, the collected data is evaluated within the enterprise on one or more of computers 102_1 through 102_N.

Each server 104 also includes standard components, such as a central processing unit, input/output devices 132, a bus 134 and a NIC 136. A memory 140 is connected to bus 134. The memory 140 stores instructions executed by the central processing unit 136. In one embodiment, the memory 140 stores a security event evaluator 142, which collects security event data from one or more client devices 102_1 through 102_N. More particularly, the security event evaluator 142 implements operations disclosed in detail below.

Figure 2:
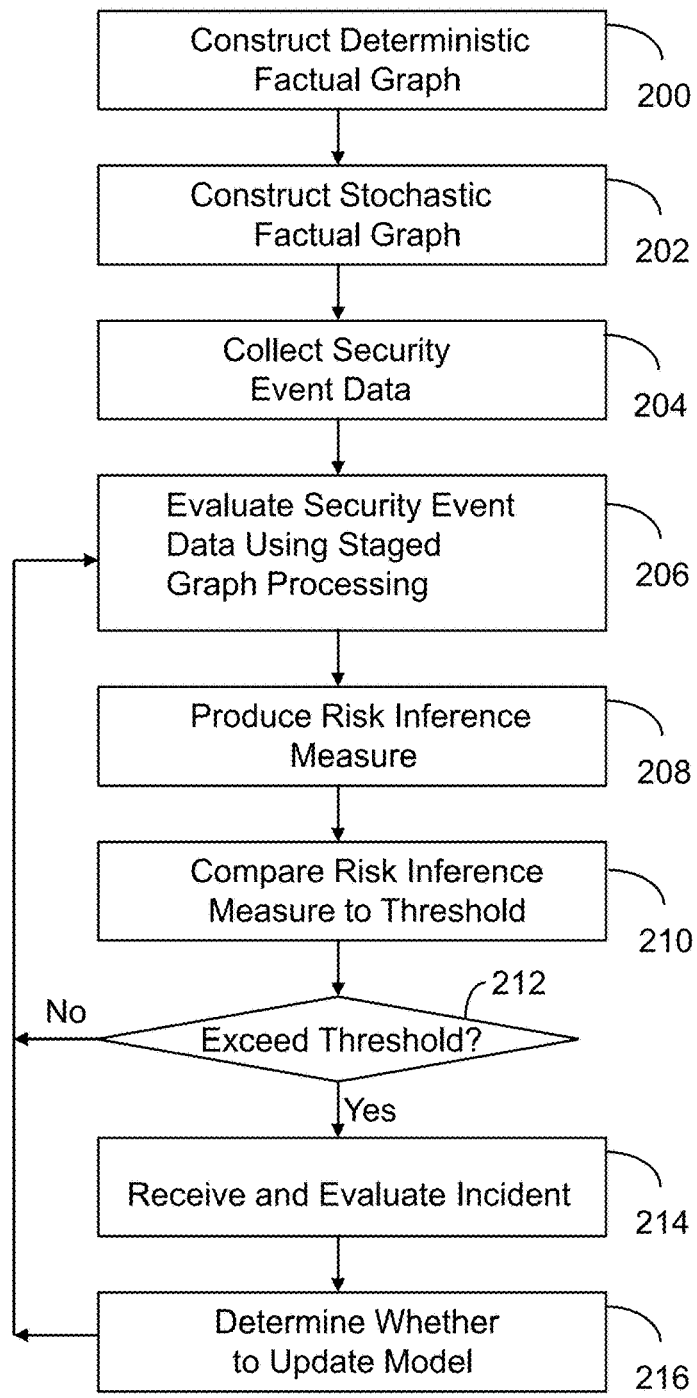
FIG. 2 illustrates processing operations associated with an embodiment of the invention.
Figure 3:
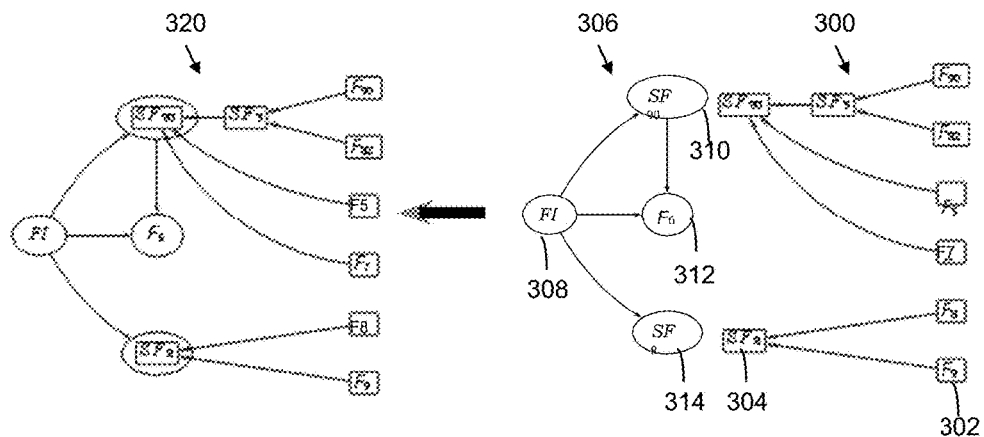
FIG. 3 illustrates the relationship between a deterministic factual graph and a stochastic factual graph processed in accordance with an embodiment of the invention.

FIG. 2 illustrates processing operations associated with an embodiment of the invention. Initially, a deterministic factual graph is constructed. FIG. 3 illustrates an exemplary deterministic factual graph 300 with factual graph leaf nodes (e.g., 302) individually resolving facts to discrete-valued outcomes that lead to parent nodes (e.g., 304) representing a superfact. Each superfact is a qualitative characterization summarizing discrete-valued outcomes.

The deterministic factual graph is utilized to reduce the number of subject matter expert probability judgments required to be captured within a Bayesian network. The deterministic factual graph uses discrete-valued logic on base facts in a table for all possible values of the discrete outcome, to define a qualitative value to a superfact (e.g., the source is "highly suspicious" based on this combination of fact values).

Returning to FIG. 2, the next processing operation 202 is to construct a stochastic factual graph. FIG. 3 illustrates a stochastic factual graph 306 including a base node 308 and individual nodes 310, 312, and 314. The stochastic factual graph 306 has at least one leaf node incorporating a factual from the deterministic factual graph 300, in this case, at nodes 310, 312, and 314. The stochastic factual graph 306 is a Bayesian network where each node is associated with a conditional probability table (in general, a probability function). Edges between stochastic factual graph nodes represent conditional dependencies. Factual Diagram 320 of FIG. 3 is the combination of the deterministic factual graph 300 and the stochastic factual graph 306. Factual Diagram 320 represents the staged graph processing that produces a risk inference measure, as demonstrated below.

Figure 4:
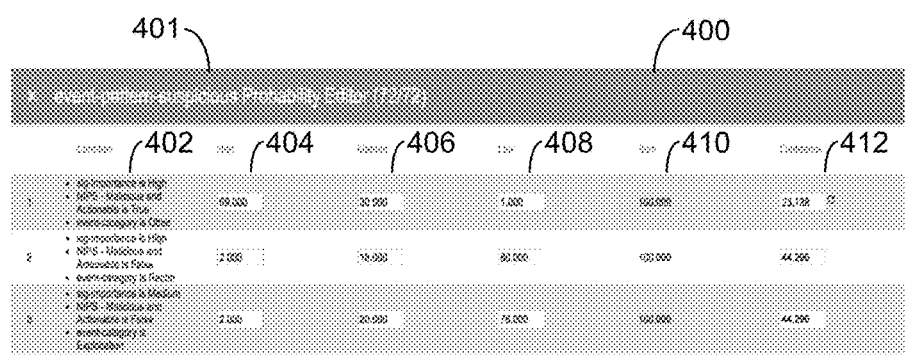
FIG. 4 illustrates a graphical user interface that may be used to ascribe probabilities to a stochastic factual graph node associated with an embodiment of the invention.

FIG. 4 illustrates a graphical user interface 400 that may be supplied to assign a probability table to a node. In this example, node 401 ("event-pattern-suspicious") has discrete outcomes high 404, medium 406 and low 408. The user interface 400 includes a specification of a condition 402. Given condition 402, node 401 is ascribed a probabilistic distribution between its possible discrete outcomes. The probabilities should add up to a normalized value (e.g., 1 for a range between 0 and 1, or 100 for a range between 0 and 100). A confidence measure 412 may be ascribed to the selected probabilities.

The condition 402 may be any condition associated with a risk assessment. The techniques of the invention may be applied, for example, to a risk of system compromise or online fraud. The techniques of the invention may also be applied to security alert risk assessment. Embodiments of the invention are disclosed in connection with security risk assessment by way of example, not limitation.

Prior to assigning probabilities to nodes in the stochastic factual graph, discrete-valued outcomes for facts are characterized in a deterministic factual graph. For example, the deterministic factual graph may include leaf nodes that characterize source internet protocol address facts. For example, the source internet protocol address facts may assess whether the address is internal to the enterprise or external to the enterprise. The facts may determine whether the source internet protocol address is a TOR exit node or a public virtual private network. The fact may be related to a country of origin. The fact may relate to whether the address is associated with an enterprise business partner. Similarly, a destination internet protocol address may be assessed for Boolean conditions, such as whether the destination is on a blacklist or whether the destination connects to an open port.

The deterministic factual graph may have leaf nodes characterizing a known intrusion detection signature. The intrusion detection signature may then be compared to a blacklist and/or whitelist of signatures.

The deterministic factual graph may have leaf nodes characterizing a suspicious temporal security alert pattern. For example, the Boolean conditions may flag a suspicious time of day for the pattern of events.

The deterministic factual graph may have leaf nodes characterizing network persistence facts. The network persistence facts may represent suspicious network connections, auto start modifications, suspicious services or scheduled tasks, unusual Windows® process behavior, additions of users and groups, or alternate data stream use.

The deterministic factual graph may have leaf nodes characterizing detection avoidance facts, such as audit log modifications, security services tampering, file deletion, file permissions modifications, PowerShell modifications, or settings bypasses.

The deterministic factual graph may have leaf nodes characterizing network exploitation facts, such as suspicious downloads, exploit kits, untrusted or unsigned child processes, vulnerable applications spawning children, and privilege escalation.

The deterministic factual graph may have leaf nodes characterizing data staging facts, such as creation and deletion of network shares, directory creation, file compression and encryption, file copies, and file transfers initiated.

The deterministic factual graph may have leaf nodes characterizing network lateral movement facts, such as network mapping/scanning, suspicious PowerShell or network use, suspicious remote desktop protocol connections, listing of domain users and groups, remote system information collection, and connections to unusual network shares.

The deterministic factual graph may have leaf nodes characterizing network reconnaissance facts, such as general system information collection, process and services listing, search for files or directories, view network configuration/shared resources, and view audit logs or configurations.

A deterministic factual graph manifests a truth table of all possible combinations of facts, and then characterizes whether it is a highly important signature, a moderately important signature, or an unimportant signature, based on these combinations. Such a characterization constitutes a superfact.

This same form of reasoning is applied to all the nodes in the Bayesian network to arrive at qualitative values. At the layer of the Bayesian inference, a DAG describes the conditional dependencies and flow of influence among the network nodes in a joint probability. The purpose of this Bayesian model is to infer the likelihood of a compromised system, or the likelihood of actionable malicious activity, given a security event.

Stochastic factual graph creation includes the utilization of a subject matter expert to ascribe probability judgments using conditional probability. A chain rule is then used to seed the belief network. These judgments are Bayesian priors, and as such the models' judgment will improve as it encounters real incidents in real-world usage, as demonstrated below.

In summary, all possible states of modeled facts are specified. Those outcomes are then used to qualitatively describe nodes in a Bayesian network, where all possible states of the world are modeled using conditional probability. The use of deterministic factual graphs and associated superfacts and the subsequent incorporation of superfacts into a stochastic factual graph reduces the number of required probability judgments to a tractable amount, which stands in contrast to the example above of a Bayesian network model that requires a prohibitively large amount of probability judgments to seed a Bayesian network model.

Returning to FIG. 2, after the deterministic factual graph and stochastic factual graph are created, security events are collected 204. For example, the security event collector 122 may collect security event data within an enterprise comprising client machines 102_1 through 102_N. The incident data is evaluated using staged graph processing 206. The staged graph processing includes a first stage of processing of the deterministic factual graph to produce an outcome for each superfact within a deterministic factual graph. The second stage of staged graph processing computes a risk inference measure by processing the stochastic factual graph. The staged graph processing is represented as the Factual Diagram 320 of FIG. 3.

The risk inference measure is compared to a threshold 210. If the risk inference measure does not exceed the threshold (212—No), control returns to block 206. If the risk inference measure exceeds the threshold (212—Yes), an incident is received and evaluated 214. For example, the security event evaluator 142 may send to client device 102_1 an alert.

A determination is then made as to whether to update the model 216 (i.e., whether to update either the deterministic factual graph and/or stochastic factual graph). For example, if the incident is deemed benign, then an update is not required. On the other hand, if the incident is deemed malicious by the model, yet determined by the client to be benign (i.e., false positive), it may be desirable to update a probability associated with the stochastic factual graph.

The invention is more fully appreciated in connection with a specific example. Consider the case of estimating an endpoint's security status. The disclosed technique processes security events from the endpoint into a quantity referred to as the Security Domain Inference Measure, or SDIM for short. For the purposes of this discussion, an "endpoint" is an end-user device, such as a client device 102_1 through 102_N. A "security event" is a map, i.e., a set of key-value pairs, representing relevant security information about that endpoint at a certain point in time.

The SDIM is defined as a probability so that it reflects the likelihood of an undesirable security status at an endpoint. For instance, in one security context, an SDIM of 0.90 could imply a 90% chance of actionable malicious activity. In another security context, it could imply a 90% chance of a compromised system. Being a probability, it lies in the closed interval [0, 1]. The ends of this interval signify certainties, i.e., 0 (1) means the sure absence (presence) of an undesirable security status.

As previously discussed, a deterministic factual graph incorporates facts at leaf nodes. A factual T is a query whose resolution is one of $\eta(T)$ discrete values. The resolutions themselves will be denoted as $^1t, ^2t, \ldots, ^{\eta(T)}t$. A factual with a specified resolution is said to be resolved.

A factual is either a fact or a superfact. The only difference between the two is the manner in which they are resolved. Whereas a fact's resolution is determined by an agent external to the framework described in this disclosure, a superfact's resolution is some function of the resolutions of one or more facts or superfacts.

Table 1 shows a few real factuals relevant to security. All rows except the last are facts; the last is a superfact. The query for a factual T is represented as Q(T). As an example, the first row shows a factual whose query is "Processes launched from suspicious directories?" It will resolve to either true or false.

We typically use F and SF (with or without a subscript) to notate facts and superfacts. Their resolutions, when discussed notionally, will be written as $^jf$ and $^lsf$ ($1 \le j \le \eta(F)$, $1 \le l \le \eta(SF)$). Actual resolutions will be written as in Table 1.

TABLE 1

| T | Q(T) | Resolutions | $\eta(T)$ |
|---|---|---|---|
| $F_2$ | Processes launched from suspicious directories? | true, false | 2 |

TABLE 1-continued

| T | Q(T) | Resolutions | $\eta(T)$ |
|---|---|---|---|
| $F_0$ | Category of Windows device? | workstation, server, undefined | 3 |
| $F_1$ | Attempts made to view file attributes? | true, false | 2 |
| $F_4$ | Account type? | admin, user, system, unknown | 4 |
| $F_3$ | Attempts made to list processes or services? | true, false | 2 |
| $SF_0$ | Signs of local recon? | yes, maybe, no | 3 |

The Factual Diagram 320 comprises two labelled DAGs: the SFG (Stochastic Factual Graph) 306 and the DFG (Deterministic Factual Graph) 300. Both graphs model dependencies—stochastic ones by the former and deterministic ones by the latter. Formally, an FD is the tuple (S, D), where S is the SFG and D is the DFG.

FIG. 3 shows Factual Diagram 320. Members of the node set V(S) (or V(D)) are shown as ovals (boxes). Members of the arc set E(S) (or E(D)) are shown as single-headed (or double-headed) arrows. Nodes in $V(S) \cap V(D)$ are drawn overlapped. These will be referred to as the linkage nodes, e.g., $SF_8$ and $SF_{90}$ in FIG. 3.

DFG nodes stand for factuals. In particular, a node is a fact if its in-degree is zero; it is a superfact otherwise. An arc from a to b means that a (which can be either a fact or a superfact) directly and deterministically influences b (which can only be a superfact). It also means, equivalently, that b directly and deterministically depends on a. This dependence is captured by the resolution function.

Thus, a DFG D is the tuple (V(D), E(D), RFM(D)), where V(D) and E(D) are the node and arc sets, and where RFM(D) is the resolution function map. For any superfact SF in V(D), RFM(D)(SF) is its resolution function.

Every superfact has a resolution function that gives its resolution given the resolutions of the factuals that constitute it. A resolution table could enumerate that function.

Table 2 shows the resolution function for $SF_{90}$. This superfact depends on $F_7$, $F_5$, and $SF_9$. Suppose $\eta(F_7)=\eta(F_5)=2$, and $\eta(SF_9)=\eta(SF_{90})=3$. Then, $F_7$ has two resolutions; we write them as $^1f_7$ and $^2f_7$. Each row of the table shows how a combination of resolutions for $F_7$, $F_5$, and $SF_9$ affects $SF_{90}$. The number of rows in the table is the product $\eta(F_7)\eta(F_5)\eta(SF_9)$.

Resolution functions can also be expressed in closed form. Table 3 shows an example that matches a Truth Table. Its closed form uses the Boolean Exclusive OR connective $\oplus$ (i.e., $SF_{21}=F_{15} \oplus F_{13} \oplus SF_{29}$).

TABLE 2

| $F_7$ | $F_5$ | $SF_9$ | $SF_{90}$ |
|---|---|---|---|
| $^1f_7$ | $^1f_5$ | $^1s_9$ | $^2s_{90}$ |
| $^1f_7$ | $^1f_5$ | $^2s_9$ | $^2s_{90}$ |
| $^1f_7$ | $^1f_5$ | $^3s_9$ | $^1s_{90}$ |
| $^1f_7$ | $^2f_5$ | $^1s_9$ | $^2s_{90}$ |
| $^1f_7$ | $^2f_5$ | $^2s_9$ | $^3s_{90}$ |
| $^1f_7$ | $^2f_5$ | $^3s_9$ | $^3s_{90}$ |
| $^2f_7$ | $^1f_5$ | $^1s_9$ | $^3s_{90}$ |
| $^2f_7$ | $^1f_5$ | $^2s_9$ | $^2s_{90}$ |
| $^2f_7$ | $^1f_5$ | $^3s_9$ | $^2s_{90}$ |
| $^2f_7$ | $^2f_5$ | $^1s_9$ | $^1s_{90}$ |
| $^2f_7$ | $^2f_5$ | $^2s_9$ | $^1s_{90}$ |
| $^2f_7$ | $^2f_5$ | $^3s_9$ | $^2s_{90}$ |

TABLE 3

| $F_{15}$ | $F_{13}$ | $SF_{29}$ | $SF_{21}$ |
|---|---|---|---|
| false | false | false | false |
| false | false | true | true |
| false | true | false | true |
| false | true | true | false |
| true | false | false | true |
| true | false | true | false |
| true | true | false | false |
| true | true | true | true |

In an SFG, all nodes except the root stand for factuals. An arc from c to d means that c (which can be either the root or a factual) directly and probabilistically influences d (which can only be a factual). Equivalently, d directly and probabilistically depends on c. A conditional probability table captures this dependence. Thus, the SFG corresponds to a Bayesian network.

Figure 5:
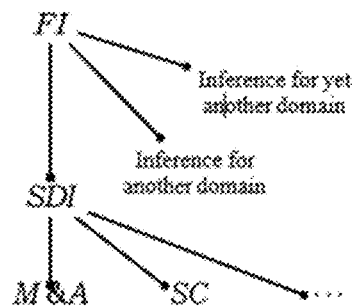
FIG. 5 illustrates an inference hierarchy associated with an embodiment of the invention.

FIG. 5 represents an inference hierarchy associated with an embodiment of the invention. The root FI represents the "factual inference". The interpretation of FI depends on the domain to which the FD is applied. We call an FI for the security domain a "security domain inference" or SDI. Different security contexts will have different kinds of SDI, e.g., M&A for the "Malicious & Actionable" inference, and SC for the "System Compromise" inference.

Figure 6:
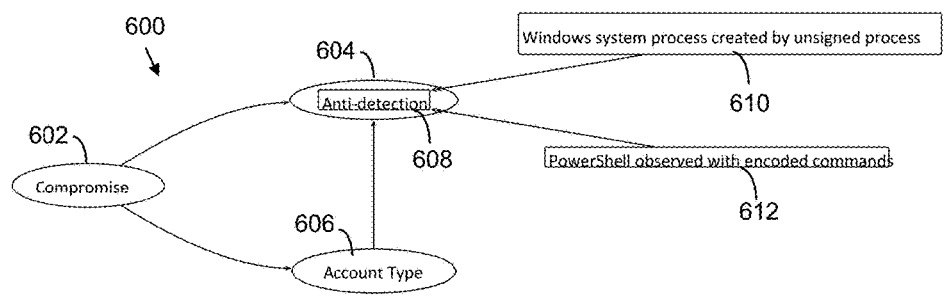
FIG. 6 illustrates an exemplary deterministic factual graph and a stochastic factual graph processed in accordance with an embodiment of the invention.

FIG. 6 shows a real example in which FI is an SC. Table 4 illustrates facts to assess an endpoint compromise. Fact $F_1$ corresponds to node 610, fact $F_2$ corresponds to node 612, and fact $F_3$ corresponds to node 606.

TABLE 4

| T | Q(T) | Resolutions | η(T) |
|---|---|---|---|
| $F_1$ | Was a Windows system process created by an unsigned process? | true, false | 2 |
| $F_2$ | Was PowerShell observed with encoded commands? | true, false | 2 |
| $F_3$ | What account type is using the system? | admin, user, system | 3 |

Table 5 illustrates superfact resolution logic for node 604.

TABLE 5

| $F_1$ Windows system process created by an unsigned process | $F_2$ PowerShell observed with encoded commands | $SF_1$ Signs of anti-detection |
|---|---|---|
| false | false | no |
| false | true | maybe |
| true | false | maybe |
| true | true | yes |

Before building the FD, one needs to decide, given the available sources of data on an endpoint, what facts are available as inputs to the Factual Diagram that are relevant to determining whether a system is compromised. In this example, the data source is a program running on each endpoint (e.g., security event collector 122 on client 102_1) that periodically sends cases for analysis to a centralized system (e.g., security event evaluator 142 on server 104_1). An example fact $F_1$ in a case is: Was a Windows system process created by an unsigned process? with the possible outcomes true and false so that: $F_1 \star \{true, false\}$. The rest of the available facts in each case from the data source can be seen in Table 4.

Given the set of input facts $\{F_1, F_2, F_3\}$, the next step is to construct DFG and SFG structures for a given model. In this example, we choose a superfact $SF_1$: Were signs of anti-detection observed? to be resolved from Was a Windows system process created by an unsigned process? and $F_2$: Was PowerShell observed with encoded commands? We give it the possible resolutions {yes, maybe, no}.

Likewise, we construct the SFG relationships. Namely, the output node System Compromise has a direct probabilistic influence on $SF_1$ and $F_3$. Additionally, we note that account type has an influencer relationship to anti-detection. In layman's terms, this relationship reflects the fact that accounts with administrator privileges may, in the course of normal operation, perform actions on endpoints that have the same outward appearance of a hacker who has compromised the system and is attempting to avoid detection.

Now that the DFG is complete, we decide the resolution function for the superfacts in the model. In our example, this is only one node, $SF_1$: Were signs of anti-detection observed? This particular superfact 604 has two child facts 610 and 612, each with two outcomes. The table representation of $SF_1$ thus has 4 input rows to represent all possible combinations of child outcomes.

The resolution function displayed in Table 5 reflects the belief that a value of true for either child fact of the anti-detection superfact indicates it is possible that we are observing anti-detection, whereas a value of true for both is a strong indication of anti-detection.

The SFG includes nodes 602, 604, and 606. As stated earlier, the SFG is a Bayesian network. The probability distributions shown in Table 6 represent such a network. They reflect the belief that while an intruder manipulating an endpoint might cause us to observe signs of anti-detection, we also may observe those signs as a result of the non-malicious actions of a system administrator operating under an admin account. Put more simply, we could observe signs of anti-detection because the system is compromised or because an administrator is performing normal non-malicious administrator tasks.

At this point, the Factual Diagram is ready to execute. The output is a number in the closed interval [0, 1] representing the likelihood that an endpoint is compromised. Let us go through the example evaluation of the case:

$\{F_1=true, F_2=true, F_3=user\}$

Step 1 is to compute the resolution of each superfact in the DFG; in this simple example there is only $SF_1$: anti-detection to compute. Following the logic specified in Table 5, for inputs $\{F_1=true, F_2=true\}$, anti-detection resolves to yes. The union of facts and resolved superfacts is thus:

$\{F_1=true, F_2=true, F_3=user, SF_1=yes\}$

Step 2 is to compute the SDIM outcome of the SFG, given the inputs from facts and resolved superfacts. Evaluating the SFG with the probabilities shown in Table 6 for the facts and superfact resolutions shown above, yields a value of 0.7 or 70%.

A logical rule for deciding whether to escalate a potentially compromised endpoint is to escalate if the likelihood of compromise is >=50%. According to this rule, the model should escalate this system for further evaluation by an incident response team in a cybersecurity organization.

For a different example, consider the case:

$\{F_1=true, F_2=true, F_3=admin\}$ which is equivalent to the first example, except the account type is admin rather than user. When evaluated all the way through, the FD yields a 35.9% likelihood of compromise, which the model should not escalate to the end user. Once again, in this model the decision not to escalate when the account type is admin reflects the fact that administrators sometimes exhibit behavior that appears similar to an intruder attempting to avoid detection.

TABLE 6

| P (SC) | |
|---|---|
| true | false |
| 0.20 | 0.80 |

| P ($F_3$: account type) | | | |
|---|---|---|---|
| SC | admin | user | system |
| false | 0.20 | 0.70 | 0.10 |
| true | 0.25 | 0.60 | 0.15 |

| P ($SF_1$: anti-detection) | | | | |
|---|---|---|---|---|
| SC | $F_3$ | yes | maybe | no |
| false | admin | 0.25 | 0.35 | 0.40 |
| false | user | 0.10 | 0.20 | 0.70 |
| false | system | 0.05 | 0.15 | 0.80 |
| true | admin | 0.70 | 0.20 | 0.10 |
| true | user | 0.80 | 0.15 | 0.05 |
| true | system | 0.55 | 0.30 | 0.15 |

In practice, one can use this Factual Diagram to build an escalation engine for a large collection of endpoints sending periodic status reports to a centralized collection system. The case execution examples given above can be repeated at scale for many endpoints sending data to the escalation engine. Additionally, if adding input facts to the model will help with accuracy, edits can be made to the data collection software to provide that extra level of detail to a revised Factual Diagram. In addition, specialized software can be built to assist subject matter experts with creating new (or editing existing) Factual Diagrams in other security-related domains.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs"), and ROM and RAM devices. Examples of computer code include machine code, such as produced by a compiler, and files containing higher-level code that are executed by a computer using an interpreter. For example, an embodiment of the invention may be implemented using JAVA®, C++, Clojure, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
   collecting at a first machine information characterizing an incident on a second machine, wherein the first machine and the second machine communicate via a network;
   processing a deterministic factual graph to produce superfacts, wherein the deterministic factual graph has deterministic factual graph leaf nodes individually resolving facts characterizing the incident to discrete-valued outcomes, and parent nodes of the deterministic factual graph leaf nodes resolving the discrete-valued outcomes to superfacts, wherein each superfact is a qualitative characterization summarizing discrete-valued outcomes;
   processing a stochastic factual graph to produce a risk inference measure for the incident, wherein the stochastic factual graph has stochastic factual graph leaf nodes incorporating the facts or superfacts, wherein the stochastic factual graph is a Bayesian network wherein except for a base node each stochastic factual graph node is associated with a probability function and edges between stochastic factual graph nodes represent conditional dependencies;
   comparing the risk inference measure to an escalation threshold;
   evaluating the incident when the risk inference measure exceeds the escalation threshold;
   evaluating the incident to reach a risk conclusion; and
   updating a probability function in the Bayesian network based upon the risk conclusion.

2. The computer implemented method of claim 1 wherein evaluating includes evaluating a representation of at least part of the stochastic factual graph or the deterministic factual graph.

3. The computer implemented method of claim 1 wherein the risk inference measure is a fraud risk inference.

4. The computer implemented method of claim 1 wherein the risk inference measure is a security risk inference.

5. The computer implemented method of claim 1 wherein the deterministic factual graph has leaf nodes characterizing source internet protocol address facts.

6. The computer implemented method of claim 1 wherein the deterministic factual graph has leaf nodes characterizing destination internet protocol address facts.

7. The computer implemented method of claim 1 wherein the deterministic factual graph has leaf nodes characterizing a known intrusion signature.

8. The computer implemented method of claim 1 wherein the deterministic factual graph has leaf nodes characterizing a suspicious temporal event pattern.

9. The computer implemented method of claim 1 wherein the deterministic factual graph has leaf nodes characterizing persistence facts.

10. The computer implemented method of claim 1 wherein the deterministic factual graph has leaf nodes characterizing detection avoidance facts.

11. The computer implemented method of claim 1 wherein the deterministic factual graph has leaf nodes characterizing system exploitation facts.

12. The computer implemented method of claim 1 wherein the deterministic factual graph has leaf nodes characterizing data staging facts.

13. The computer implemented method of claim 1 wherein the deterministic factual graph has leaf nodes characterizing lateral movement facts.

14. The computer implemented method of claim 1 wherein the deterministic factual graph has leaf nodes characterizing reconnaissance facts.

\* \* \* \* \*